G. C. CHASE.
ADDING MACHINE.
APPLICATION FILED NOV. 17, 1917.
1,340,374.
Patented May 18, 1920.
3 SHEETS—SHEET 1.
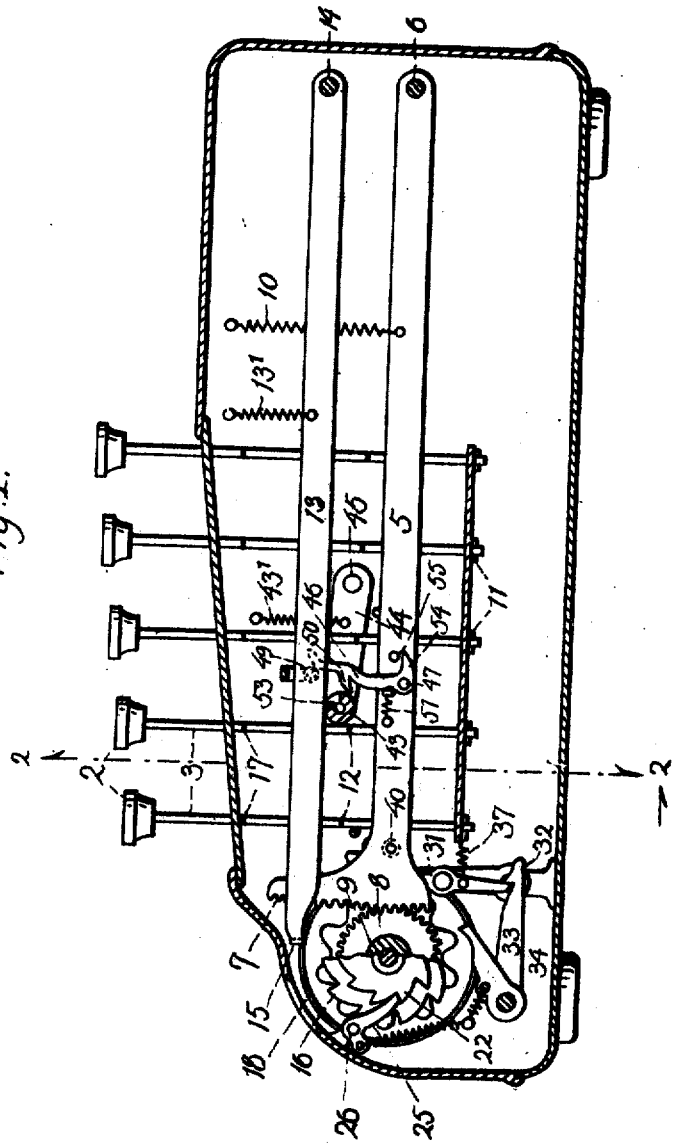
Inventor
Geo. C. Chase,
E.W. Anderson & Son
Attorneys

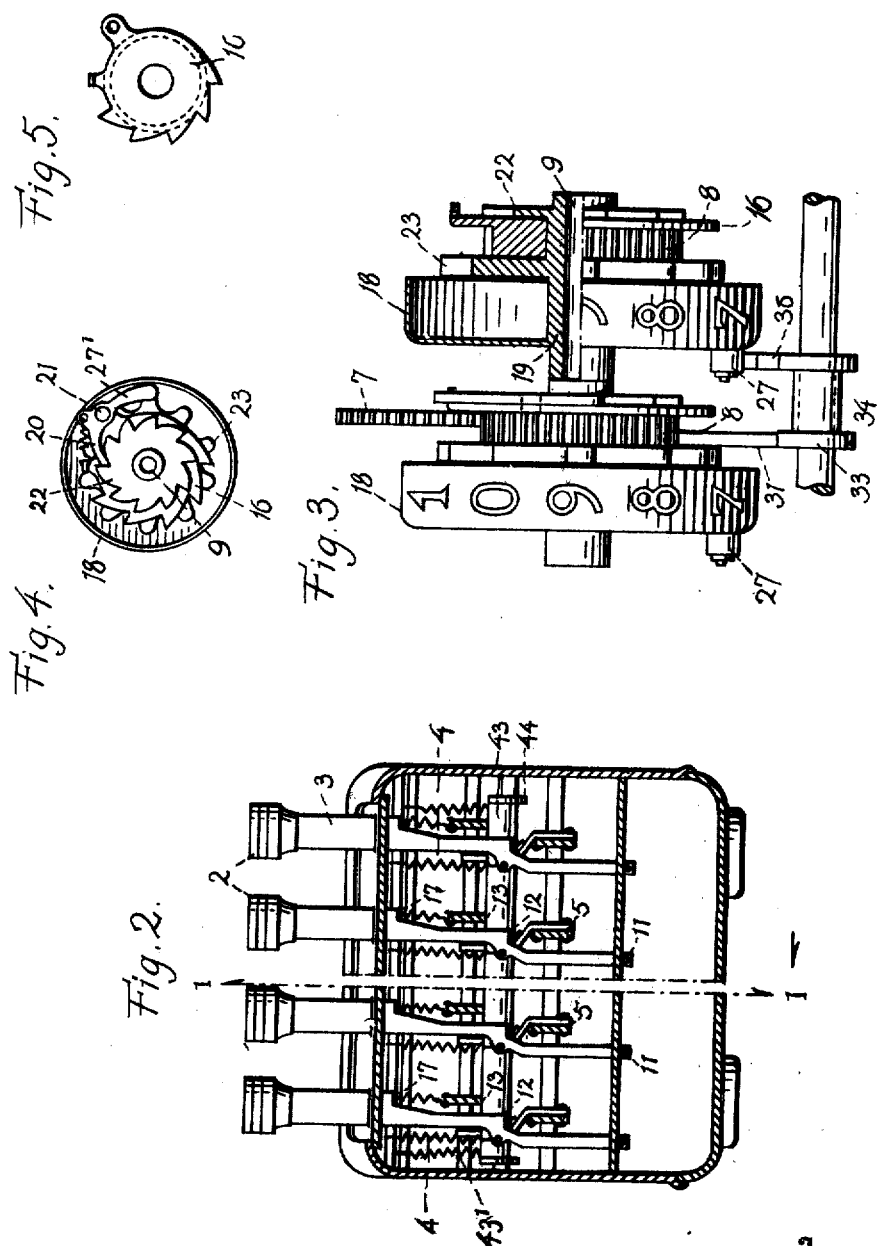

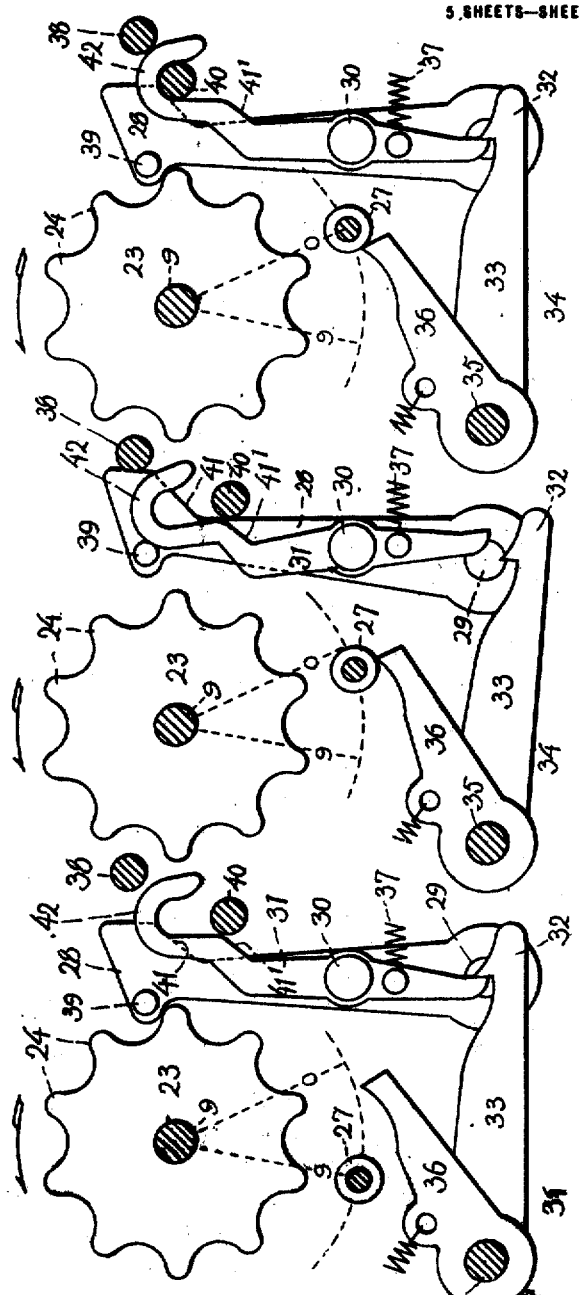

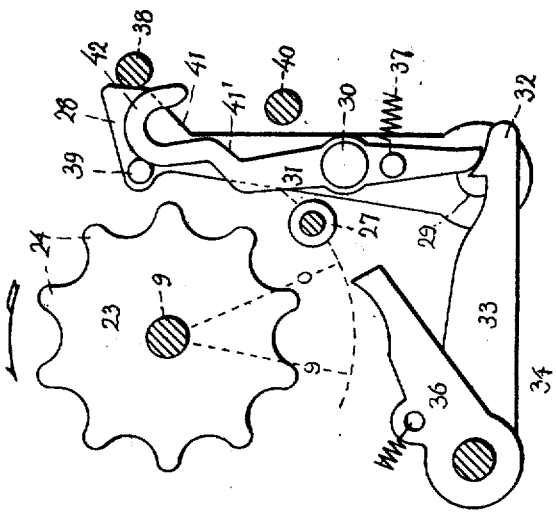
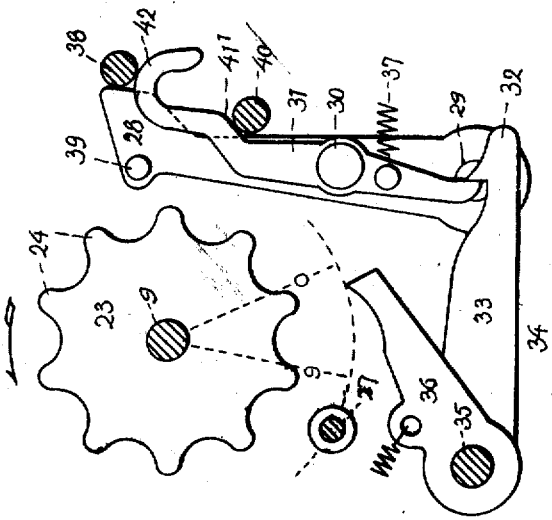

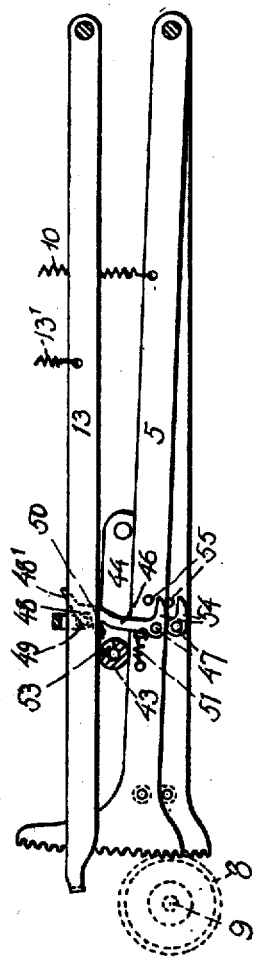
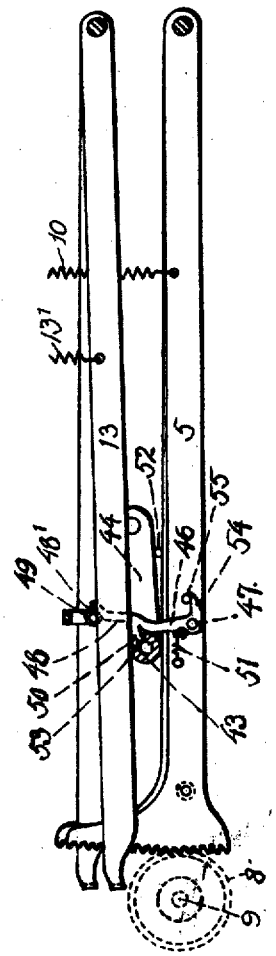

UNITED STATES PATENT OFFICE.

GEORGE C. CHASE, OF EAST ORANGE, NEW JERSEY, ASSIGNOR TO CHASE ADDING MACHINE CORPORATION, OF ORANGE, NEW JERSEY, A CORPORATION OF DELAWARE.

ADDING-MACHINE.

1,340,374.

Specification of Letters Patent.

Patented May 18, 1920.

Application filed November 17, 1917. Serial No. 202,533.

*To all whom it may concern:*

Be it known that I, GEORGE C. CHASE, a citizen of the United States, resident of East Orange, in the county of Essex and State of New Jersey, have made a certain new and useful Invention in Adding-Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a vertical longitudinal section of the machine, on the line 1—1, Fig. 2.

Fig. 2 is a vertical transverse section, on the line 2—2, Fig. 1.

Fig. 3 is a detail front view, partly in section, of two numeral wheels and certain of their driving connections.

Fig. 4 is a detail side view of a numeral wheel, and showing certain of its driving connections.

Fig. 5 is a detail side view of one of the stop wheels.

Figs. 6, 7, 8, 9 and 10 are diagrammatic views, in series, of a numeral wheel, its arresting means, and means for controlling the same, showing the cycle of operations.

Figs. 11 and 12, in connection with Fig. 1, hereinbefore referred to, show the cycle of operations of the momentum stops, the segment gear levers and stop levers being shown in side view and the universal bar in section.

This invention relates mainly to that class of machines known as key-driven, non-listing adding machines, wherein there is a series of numeral wheels, each numeral wheel being provided with a series of keys, any one of which may serve to rotate its respective numeral wheel whenever depressed.

One object of the invention is to provide a simple and inexpensive machine of the character described, which will be reliable, compact and readily portable. Another object of the invention is to provide a simple and reliable and novel transfer mechanism for carrying the tens from the lower to higher numeral wheels. Another object of the invention is to provide a simple and positive locking device for arresting the numeral wheels upon the completion of the key registrations and the completion of the carrying of the tens. Other objects of the invention will be apparent as they are set forth in these specifications and drawings.

Machines may be built having as many denominational series of keys as required for any given capacity. The drawings show each series to be provided with five keys, reading from 1 to 5. It is customary when operating machines of this character to add the figures 6, 7, 8 and 9 by making two strokes on the three, four or five keys, as required. For example, to add 96, depress 4 and 5 in the tens column and 3 twice in the units column. If desired, this machine may be made longer, so as to include the additional rows of 6, 7, 8 and 9 keys, which permits of performing the four elemental functions of arithmetic as is customary on machines of this character.

In the accompanying drawings, illustrating the invention, the numeral 2 designates depressible numeral keys, arranged in denominational series and having stems 3 and return springs 4.

Relating to each series of denominational keys is a depressible lever 5, pivoted in rear at 6 and at its forward end provided with a segment rack 7, engaging a pinion 8 carried by a shaft 9. Each lever has a return spring 10.

Each key stem is provided with a stop 11, limiting its upward movement, and a shoulder 12, engaging the respective segment lever in the depression of the key and actuating the lever to turn the pinion 8.

Means are provided to selectively stop the rotation of the pinions 8, according to the digits to be accumulated on the numeral wheels, consisting preferably of levers 13, overlying and approximately parallel to the segment levers and pivoted in rear at 14, and at their forward ends 15 adapted to be depressed into the path of the teeth of a wheel 16, provided with five teeth in the present case and fast to said pinion, said levers 5 being acted upon differentially to rotate the pinion to the proper varying degrees, owing to the location at varying distances from its pivoted end of the key stems of the denominational series of keys relating thereto.

The levers 13 are depressed by shoulders 17 of the key stems when a key has nearly completed its downward movement, and each lever has a return spring 13′.

Numeral wheels 18 are loosely mounted upon the shaft 9, and means are provided to turn any one of said wheels to the proper extent upon depression of a key of the denominational series relating thereto, said means consisting usually of a sleeve hub extension 19, fast to each numeral wheel, loosely mounted upon the shaft 9 and upon which in turn the pinion 8 and wheel 16 are loosely mounted, a spring-pressed pawl 20 being pivoted to the wheel 16 at 21 and engaging the teeth of a ratchet wheel 22 carried by the hub 19 at one end thereof, said hub at its other end or side adjacent to the numeral wheel carrying fast thereto a wheel 23, having teeth 24 and termed a star wheel. Rotation of the pinion 8 will, through the pawl 20 and ratchet 22, turn the hub extension 19 and the numeral wheel of which said extension forms a part, backward movement of the wheels being prevented by a spring-pressed pawl 25 engaging the ratchet 22 and pivoted at 26 to a fixed part of the machine or framing. The pawl 20 may have a counterbalancing extension 27′, to prevent it from swinging away from its ratchet when the parts are in rotation.

Whenever a key is depressed, the pawl 20 slides idly over the ratchet 22 during the downward stroke, and the numeral wheel remains stationary, being held by the backstop pawl 25, engaging the ratchet 22. During the upward stroke of the key the pawl 20 advances the ratchet 22 and the numeral wheel 18, the ratchet 22 turning beneath the backstop pawl.

If a numeral wheel stands at zero and its key, as the 4 key, for instance, is depressed and released, 4 will appear as the numeral wheel reading. If, then, the key 5 in the same column be likewise depressed and released, the numeral wheel will be advanced further to 9. Any further additions to the same numeral wheel will involve the transfer of 10 to the next higher numeral wheel, the mechanism for which will now be described.

There is normally sufficient space between the shoulder 12 of the key stem and the upper edge of the corresponding segment lever to permit of one extra step or degree of upward movement of the segment lever, which extra movement may be termed the actuator's carrying step. This extra upward movement of the segment lever takes place at the end of the usual or ordinary upward movement of said lever whenever there is carrying to be performed, both the ordinary and the extraordinary movement of the segment lever taking place through the influence of the same retracting spring 10 of said lever, and the extra movement causing an additional rotation of the numeral wheel, to carry. Each numeral wheel except the one of highest order is provided with a lateral pin or roll 27.

In order to provide against the numeral wheels running ahead by momentum, and thereby counting an error, and for other purposes hereinafter explained, I provide for each numeral wheel a detent 28, pivoted at one end at 29 and at its free end engaging the ten-pointed star wheel 23, rigidly attached to the numeral wheel. Pivoted to each detent 28 at 30 is a detent lock 31, the lower arm of which is engaged by the hooked end 32 of one arm 33 of a latch 34, said latch of the bell-crank lever type, pivoted at 35 and having its other arm 36 engaged at its free end by the pin 27 of the next lower numeral wheel whenever that wheel passes from 9 to 0.

In the normal position of these parts, as shown in Fig. 6, the detent engaging the star wheel will, in connection with the detent lock and the latch, rigidly lock the star wheel against rotation, movement of the detent lock in a direction to release it from the latch being prevented by a lateral stud or projection 40 of the corresponding segment lever. This wheel passing from 9 to 0, in this way at once rocks the latch of the next higher numeral wheel pivotally and releases the detent lock 31, the detent 28 being then free to swing out of engagement with its star wheel.

The carrying rotation of the numeral wheel now taking place, under the influence of the extra movement of the segment lever, the detent 28 is pushed back from the star wheel in the rotation of the latter, although usually a retracting spring 37 is connected with the lower arm of the detent lock 31 and serves to retract both detent lock and detent, as shown in Fig. 7 of the drawings, a stop for the detent being shown at 38 and a stop for the detent lock being shown upon the detent at 39.

In the extra movement of the segment lever, the stud 40 thereof will move from the position shown in Fig. 7 to that shown in Fig. 8, engaging in this movement the upper cam surface 41 of the detent and returning the detent into engagement with the star wheel, the detent lock having a reversely turned or hooked upper end 42, engaged by the stud 40 in this extra movement, to reëngage the detent lock with the latch, as shown in this figure.

The carrying having been accomplished, it is necessary to restore all segment levers thereby left above normal position, before the completion of any further registration upon the machine, and to insure this restoration the following means are provided:

Beneath the series of levers 13, and between the same and the series of segment levers, is located a universal control bar 43, extending transversely of both series of levers and mounted upon the ends of rocker arms 44, pivoted at their other ends to the casing or framing at 45, said bar normally held against the lower edges of the levers 13 by its spring 43'. This transverse bar 43 being depressed by the operation of any lever 13, will engage any one or more of the segment levers remaining above normal position, and return said segment lever or levers to normal depressed position, against the resistance of the return springs 10 of the levers. In this return movement of the segment lever, the corresponding pinion will be turned by the lever, the stop wheel 16 turning with the pinion and the pawl, turning with the stop wheel, sliding over the teeth of the ratchet and at the end of its movement engaging the ratchet, to hold the segment lever in normal depressed position.

The levers 13, engaging the wheels 16, through pinions 8 serve to stop the downward movement of the segment levers at points always below normal, when any such lever is depressed by operation of a key in the denominational series of keys relating thereto. After a segment lever has been moved upwardly beyond normal, to carry, and said lever is moved downwardly again or restored to normal position by depression of a key of another denominational series, special means are required to stop the downward movement of said lever at normal. This means is preferably as follows:

A latch 46 is pivoted at its lower end at 47 to each segment lever, and has an arcuate upper portion 48 engaging a roller 49, one roller being provided for each latch and mounted upon a fixed support 49' connected to the framing. The latch is also provided with a laterally projecting or hooked extension 50, a spring 51 tending to draw said latch pivotally over toward the universal control bar 43, and being prevented from so doing by the roller and arcuate portion engagement aforesaid.

The segment lever being restored to normal position as stated, owing to downward movement of a denominational key and of the universal control bar; said bar having arrived at the proper limit of its downward movement is stopped by a pin 52, extending from a stationary part of the framing and engaging a crank arm 44 of said bar. The segment lever will, however, tend to continue its downward movement, under the momentum imparted, and is allowed a slight extra downward movement (indicated in Fig. 12 of the drawings), and in this extra movement the cam end 48' of the latch will slide under the roller 49, under the influence of the spring 51, and advance the lateral or hook projection 50 into engagement with the lower shoulder of a circumferential notch 53 of the bar 43, to effectually stop any further downward movement of said lever. The extra downward movement referred to is too slight to admit of any actuation of the registering wheel thereby.

In the rise of the lever 13 to normal position, the roller 49, engaging the cam upper end 48' located above the arcuate portion 48 of the latch, will push the latter backwardly from engagement with the notch of the control bar.

It is of course necessary that a segment lever which has been previously moved upwardly to carry shall not be stopped from moving downwardly below normal position in the depression of a denominational key of the series relating to said lever; and therefore the shoulder 12 of the key will act upon the respective segment lever to depress the same, and the latch therewith, previous to the depression of the control bar by the lever 13, the latch hook being thus prevented from engaging the notch of the control bar, and being limited in its pivotal movement, caused by the spring 51, by a tail end 54 thereof engaging a stop pin 55 upon the segment lever.

The arcuate ends 48 of the latches 46 are made concentric, or substantially so, with the fulcrum of the segment levers, so that in the upward movement of a segment lever to carry, the latch carried upwardly therewith and the roller 49 will not interfere.

In the actuation of the segment lever or levers when there is no carrying to be performed, the stud 40 of the lever being depressed with the lever into the position shown in Fig. 9, the detent lock and detent will be free to move away from the corresponding star wheel, which is thereby free to turn with the numeral wheel to register the result.

In the return movement of the segment lever to normal elevated position, the lateral stud 40 thereof will engage a cam surface 41' of the detent lock, and the latch 34 being in engagement with the detent lock, and the point of such engagement being precisely in the center of the pivot of the detent, the detent lock and detent will move both together, upon the pivot of the detent as a center, to reëngage the detent with the star wheel.

In those cases, frequently occurring (see Fig. 10 of the drawings), where a segment lever is first depressed in the usual way, and during this depression the latch of this particular lever is operated by the rotation of the numeral wheel of next lower order from 9 to 0, to thereby release the detent lock, so that its cam surface 41' will not, at the end of the ordinary upward return movement of said lever, be engaged by the lateral stud 40 of the segment lever, to reëngage the detent with its star wheel, it follows as a matter of course that the numeral wheel corresponding to the depressed segment lever will only be relocked by engagement of its detent 28 with the star wheel after the extraordinary upward movement or actuator's carrying step of said lever.

With this construction it will be apparent that keys may be depressed singly, or in two or more columns simultaneously; the carrying of the tens will be correctly performed, provided all the keys depressed in adding one amount are fully released before another amount is registered by further key strokes.

The carrying rotation imparted to any given registering wheel by its segment lever necessarily occurs as the result of the actuation of a key and dial of lower denominational order, and is accomplished by such segment lever under the influence of its return spring. But a segment lever in raised position, after carry, may be restored to normal, and have its carrying energy restored, by the depression of its own key, or by depression of a key of any other denominational series, through the universal bar; and a further carry may be permitted by the release of the key so restoring said lever. It may thus occur that a carry, resulting from the actuation of a key and registering wheel of lower order, may be effected by the influence of a key of higher order or by a key of the order to which carry occurs.

When a carrying rotation is to be imparted to a numeral wheel whose respective keys have not been depressed or operated, the latch 34 having been tripped, such carrying rotation will be delayed by the universal bar until all fully depressed denominational keys are released.

No clearing or zero-setting mechanism has been described in conjunction with this invention, as many of the old and well-known constructions of the prior art may be readily adapted to the purpose by any maker skilled in the art. It is possible to restore the dials to zero, however, in case no zero-setting mechanism is provided, by merely adding the co-digit of the amount appearing upon the registering wheels.

It is obvious that the keys of the units series or column will actuate their respective segment lever directly to rotate the respective registering wheel only degrees to accord with key values, and not to carry, this being true also of a machine embodying my invention and having only a single or units column of keys.

I claim:

1. In an adding machine, register wheels, denominational keys, and an actuator operable by a denominational key to impart to its respective wheel movement to register key values and movement to register a carry.

2. In an adding machine, register wheels, denominational keys, an actuator operable by a denominational key to impart to its respective wheel movement to register key values and movement to register a carry, and means including an element carried by one of said wheels and coöperating with the actuator to time the carry.

3. In an adding machine, register wheels, denominational keys, an actuator operable by a denominational key to impart to its respective wheel movement to register key values and movement to register a carry, and locking and releasing means including an element carried by one of said wheels and coöperating with the actuator to time the carry.

4. In an adding machine, register wheels, denominational keys, an actuator for each of said wheels, certain of the actuators being each operable by its denominational key to impart to its respective wheel movement to register key values and movement to register a carry, locking means for the wheels at the end of the normal rotation thereof including a detent engaging each wheel, a latch engaging each detent, and projections carried by the actuators and engaging the detents, and means including elements carried by said wheels whereby the locking means are released at the proper time.

5. In an adding machine, registering wheels, series of denominational keys, actuators operated by the keys for rotating said wheels degrees corresponding to key values and for rotating said wheels to perform carrying operations, said actuators normally and in the carrying performance moving as a whole and in the same direction.

6. In an adding machine, registering wheels, series of denominational keys, key-impelled spring-actuated means for rotating said wheels degrees corresponding to key values and for rotating said wheels to carry, locking means for said wheels, serving also to arrest the spring-actuated means in their return before the springs thereof have completely reacted, and means including elements carried by the wheels for releasing the locking means.

7. In an adding machine, registering wheels, series of denominational keys, key-impelled spring-actuated means for rotating said wheels degrees corresponding to key values and for rotating said wheels to carry, locking means for said wheels including a detent engaging each wheel and a latch engaging each detent, the locking means serving also to arrest the spring-actuated means in their return before the springs thereof have completely reacted, and means including elements carried by said wheels for releasing the locking means.

8. In an adding machine, registering wheels, series of denominational keys, key-impelled spring-actuated means for rotating said wheels degrees corresponding to key values and for rotating said wheels to carry, locking means for said wheels including a detent engaging each wheel, a pivoted member carried by each detent and a latch engaging each said member, the locking means serving also to arrest the spring-actuated means in their return before the springs thereof have completely reacted, and means including elements carried by the wheels engaging said latches to release the locking means.

9. In an adding machine, register wheels, denominational keys, an actuator for each of said wheels, certain of the actuators being each operable by its denominational key to impart to its respective wheel movement to register key values and movement to register a carry, locking means for said wheels including a detent engaging each wheel and projections carried by the actuators and engaging the detents, said projections in the operation of the keys releasing the detents.

10. In a key-operated adding machine, register wheels, denominational keys, an actuator for each of said wheels, certain of the actuators being each operable to impart to its respective wheel movement to register key values and movement to register a carry, locking means for the wheels including a detent engaging each wheel and projections carried by the actuators and engaging the detents, said projections in the operation of the keys releasing the detents and reëngaging the detents with the wheels.

11. In an adding machine, registering wheels, series of denominational keys, means for rotating said wheels degrees corresponding to key values and for rotating said wheels to carry, upon operation of said keys, locking means for the wheels including a detent engaging each wheel, a latch engaging each detent and projections carried by the wheel-rotating means and engaging the detents, said projections in the operation of the keys releasing said detents, and means including elements carried by the wheels for releasing said latches, said projections operating also to reëngage the detents with the wheels and with the latches.

12. In an adding machine, registering wheels, series of denominational keys, spring-actuated means for rotating said wheels degrees corresponding to key values and for rotating said wheels to carry, upon actuation of said keys, locking means for said wheels serving also to arrest the spring-actuated means in their return before the springs thereof have completely reacted, and means including elements carried by the wheels for releasing the locking means, the wheel-rotating means normally and in the carrying moving as a whole and in the same direction.

13. In an adding machine, registering wheels, series of denominational keys, spring-actuated means for rotating said wheels degrees corresponding to key values and for rotating said wheels to carry, upon operation of said keys, locking means for said wheels including a detent engaging each wheel and a latch engaging each detent, the locking means serving also to arrest the spring-actuated means in their return before the springs thereof have completely reacted, and means including elements carried by said wheels for releasing the locking means, the wheel rotating means normally and in the carrying moving as a whole and in the same direction.

14. In an adding machine, registering wheels, series of denominational keys, spring-actuated means for rotating said wheels degrees corresponding to key values and for rotating said wheels to carry, upon operation of said keys, locking means for said wheels including a detent engaging each wheel, a pivoted member carried by each detent, and a latch engaging each said member, the locking means serving also to arrest the spring-actuated means in their return before the springs thereof have completely reacted, and means carried by the wheels and engaging said latches to release the locking means, the wheel-rotating means normally and in the carrying moving as a whole and in the same direction.

15. In an adding machine, registering wheels, series of denominational keys, means operable by said keys for rotating said wheels degrees corresponding to key values and for rotating said wheels to carry, locking means for the wheels including a detent engaging each wheel and projections carried by the wheel-rotating means and engaging the detents, said projections in the operation of the keys releasing the detents, the wheel-rotating means normally and in the carrying operating as a whole and in the same direction.

16. In an adding machine, registering wheels, series of denominational keys, means for rotating said wheels degrees corresponding to key values and for rotating said wheels to carry, upon operation of said keys, locking means for the wheels including a detent engaging each wheel and projections carried by the wheel-rotating means and engaging the detents, said projections in the operation of the keys releasing the detents, the wheel-rotating means normally and in the carrying operating as a whole and in the same direction and said projections operating also to reëngage the detents with the wheels.

17. In an adding machine, registering wheels, series of denominational keys, means operable by said keys for rotating said wheels degrees corresponding to key values and for rotating said wheels to carry, and means for locking said wheels at the end of the normal rotation thereof, and in carrying only at the end of the combined normal and carrying rotation.

18. In an adding machine, registering wheels, series of denominational keys, means operable by said keys for rotating said wheels degrees corresponding to key values and for rotating said wheels to carry, and means for individually locking said wheels at the end of the normal rotation thereof and in carrying only at the end of the combined normal and carrying rotation.

19. In an adding machine, registering wheels, series of denominational keys, means operable by said keys for rotating said wheels degrees corresponding to key values and for rotating said wheels to carry, means for locking said wheels at the end of the normal rotation thereof, and in carrying only at the end of the combined normal and carrying rotation, and means for releasing the locking means to release each wheel individually throughout both the normal and the carrying rotation thereof.

20. In an adding machine, registering wheels, series of denominational keys, means operable by said keys for rotating said wheels degrees corresponding to key values and for rotating said wheels to carry, and means for locking said wheels at the end of the normal rotation thereof, and in carrying only at the end of the combined normal and carrying rotation, and including a detent engaging each wheel and projections carried by the wheel-rotating means and engaging the detents.

21. In an adding machine, registering wheels, series of denominational keys, means for rotating said wheels degrees corresponding to key values and to carry, upon operation of said keys, and means for locking the wheels at the end of the normal rotation and in carrying only at the end of the combined normal and carrying rotation and including latches, and means for releasing the locking means, including elements carried by the wheels and engaging said latches.

22. In an adding machine, registering wheels, series of denominational keys, means for rotating said wheels degrees corresponding to key values and to carry, upon operation of said keys, and means for locking the wheels at the end of the normal rotation thereof and in carrying only at the end of the combined normal and carrying rotation and including a detent engaging each wheel, latches engaging the detents and projections carried by the wheel-rotating means and engaging the detents, and means for releasing the locking means, including elements carried by said wheels and engaging said latches.

23. In an adding machine, registering wheels, series of denominational keys, means for rotating said wheels degrees corresponding to key values and for rotating said wheels to carry, upon operation of said keys, and means for locking the wheels at the end of the normal rotation thereof and in carrying only at the end of the combined normal and carrying rotation and including a detent engaging each wheel and projections carried by the wheel-rotating means and engaging the detents, said projections operating also to reëngage the detents with the wheels.

24. In an adding machine, registering wheels, series of denominational keys, means for rotating said wheels degrees corresponding to key values and for rotating said wheels to carry, upon operation of said keys, means for locking the wheels at the end of the normal rotation thereof and in carrying only at the end of the combined normal and carrying rotation, and including a two-part detent engaging each wheel, latches engaging one part of each detent, and projections carried by the wheel-rotating means and engaging the latch-engaged parts of the detent, and means for releasing the locking means including means carried by the wheels and engaging said latches, said projections operating also to reëngage the detents with the wheels and with the latches.

25. In an adding machine, registering wheels, series of denominational keys, means for rotating said wheels degrees corresponding to key values and for rotating said wheels to carry, upon operation of said keys, and means for locking the wheels at the end of the normal rotation thereof and in carrying only at the end of the combined normal and carrying rotation, and including a detent engaging each wheel, a pivoted member carried by each detent, a latch engaging each said member, and means including elements carried by said wheels for releasing said latches.

26. In an adding machine, registering wheels, series of denominational keys, means for rotating said wheels degrees corresponding to key values and for rotating said wheels to carry, upon operation of said keys, means for locking said wheels at the end of the normal rotation thereof and in carrying only at the end of the combined normal and carrying rotation, and including a detent engaging each wheel, a pivoted member carried by each detent, a latch engaging one end of each member, projections carried by the wheel-rotating means and engaging the other end of said members, and means for releasing the locking means, including studs carried by said wheels and engaging said latches, said projections operating also to reëngage said members with the latches and the detents with said wheels.

27. In an adding machine, register wheels, denominational keys, actuators operable by said keys to impart to their respective wheels movement to register key values and movement to register a carry, locking means for the actuators at normal position, means for releasing the locking means including elements carried by said wheels, and means for restoring the actuators from position after carry to normal position.

28. In a key-operated adding machine, register wheels of higher and lower order, a denominational series of keys for the lower order wheel operable to impart thereto movement to register key values, carry mechanism including an actuator for said higher order wheel, locking means for said actuator at normal position, means for releasing the locking means including an element carried by the lower order wheel, and means operable by said keys independently of the wheels for restoring said actuator from position after carry to normal position.

29. In a key-operated adding machine, register wheels of higher and lower order, a denominational series of keys, an actuator for the lower order wheel operable to impart thereto movement to register key values, carry mechanism including an actuator for said higher order wheel, locking means for said last-named actuator at normal position, means for releasing the locking means including an element carried by the lower order wheel, and a transverse member coöperating with the higher order actuator to restore said lower order actuator from position after carry to normal position.

30. In a key-operated adding machine, register wheels, denominational keys, an actuator operable to impart to its respective wheel movement to register key values and movement to register a carry, means operable by said keys to return the actuator from position after carry to normal position, the keys directly related to said actuator also capable of effecting the last-named result independently of said means.

31. In an adding machine, register wheels, denominational keys, an actuator for each of said wheels, said actuators being each operable by a denominational key to impart to its respective wheel movement to register key values and movement to register a carry, and means common to all of said keys and operable thereby to return said actuators from position after carry to normal position.

32. In a key-operated adding machine, register wheels, denominational keys, an actuator for each of said wheels, said actuators being each operable to impart to its respective wheel movement to register key values and movement to register a carry, said keys each operable also to return its actuator from position after carry to normal position.

33. In an adding machine, registering wheels, denominational keys, digit selecting means actuated by said keys, means for rotating said wheels including a carrying member, and means operated by the selecting means for returning the carrying member from position after carrying to normal position.

34. In an adding machine, registering wheels, denominational keys, digit selecting means actuated by said keys, means for rotating said wheels including a carrying member, and means operated by the selecting means and including a unitary member for returning the carrying member from position after carrying to normal position.

35. In a key-operated adding machine, register wheels, denominational keys, an actuator for each of said wheels, said actuators being each operable to impart to its respective wheel movement to register key values and movement to register a carry, means for selectively stopping the actuators, and means operated by the selective-stopping means to return the actuators from position after carry to normal position.

36. In a key-operated adding machine, register wheels, denominational keys, an actuator for each of said wheels, said actuators being each operable to impart to its respective wheel movement to register key values and movement to register a carry, means operable by said keys for selectively stopping said actuators, and a member common to all of the keys and operable by the selective-stopping means to return the actuators from position after carry to normal position.

37. In a key-operated adding machine, register wheels, denominational keys, an actuator for each of said wheels, said actuators being each operable to impart to its respective wheel movement to register key values and movement to register a carry, levers operable by said keys for selectively stopping the actuators, and a member common to and operable by any of said levers to return the actuators from position after carry to normal position.

38. In an adding machine, registering wheels, denominational keys, means for rotating said wheels upon operation of said keys, the wheel-rotating means in the carrying performance operating wholly by a further movement in the same direction as the initial movement thereof, means for selectively stopping the wheel-rotating means, and means operated by the selective stopping means to return the wheel-rotating means from position after carrying to normal position.

39. In an adding machine, registering wheels, denominational keys, spring-actuated means for rotating said wheels upon operation of said keys, means for selectively stopping the wheel-rotating means, locking means for said wheels serving also to arrest the wheel-rotating means in their return before the springs thereof have completely reacted, means for releasing the locking means, and means operated by the selective stopping means to return the wheel-rotating means from position after carrying to normal position.

40. In an adding machine, registering wheels, series of denominational keys, means operable by said keys for rotating said wheels degrees corresponding to key values and for rotating said wheels to perform carrying operations, and momentum stops for the wheel-rotating means.

41. In an adding machine, registering wheels, series of denominational keys, means operable by said keys for rotating said wheels degrees corresponding to key values and to carry, and momentum stops for the wheel-rotating means to prevent over-registration when said wheels are rotated degrees corresponding to key values and when rotated to carry.

42. In an adding machine, registering wheels, series of denominational keys, means for rotating said wheels degrees corresponding to key values and for rotating said wheels to carry, upon operation of said keys, means for returning all of the wheel-rotating means from position after carrying to normal position, and means to stop the return movement of the wheel-rotating means from position after carrying at normal position, said stopping means inoperative when the wheel-rotating means is actuated to rotate the wheels degrees corresponding to key values.

43. In an adding machine, registering wheels, series of denominational keys, means for rotating said wheels degrees corresponding to key values and to carry, upon operation of said keys, momentum stops for said means to prevent over-registration in the rotation of said wheels degrees corresponding to key values, momentum stops for said, to key values, momentum stops for said means to prevent over-registration after the wheels are rotated to carry, the last named stops inoperative when said means is actuated to rotate the wheels degrees corresponding to key values.

44. In an adding machine, registering wheels, series of denominational keys, means for rotating said wheels degrees corresponding to key values and to carry, upon operation of said keys, momentum stops for said means to prevent over-registration in the rotation of said wheels degrees corresponding to key values, and momentum stops for said means operated by the first named stops to prevent over-registration after the wheels are rotated to carry.

45. In an adding machine, registering wheels, series of denominational keys, means for rotating said wheels degrees corresponding to key values and to carry, upon operation of said keys, momentum stops for said means to prevent over-registration in the rotation of said wheels degrees corresponding to key values, and momentum stops for said means operated by the first named stops to prevent over-registration after the wheels are rotated to carry, the last named stops inoperative when said means is actuated to rotate the wheels degrees corresponding to key values.

46. In a key-operated adding machine, register wheels, denominational keys, an actuator for each of said wheels, said actuators being each operable to impart to its respective wheel movement to register key values and movement to register a carry, a member common to all of the keys for returning all of the actuators from position after carry to normal position, and means carried by the actuators and coöperating with said member to stop the return movement of the actuators from position after carry at normal position.

47. In an adding machine, registering wheels, actuating means including spring members capable of imparting carrying rotations to said wheels, and keys directly actuating said members to tension the same for the purpose stated.

48. In an adding machine, registering wheels, actuating means including spring members and a member common to all of the keys, capable of imparting carrying rotations to said wheels, and keys any one of which is capable of actuating any one of said members to tension the same for the purpose stated.

49. In an adding machine, registering wheels, means including spring members for rotating said wheels degrees corresponding to key values and for imparting carrying rotations to the wheels, and keys actuating said members to tension the same for the purpose stated.

50. In an adding machine, registering wheels, means including spring members for rotating said wheels, keys actuating said members to tension the same for the purpose stated, and means for selectively arresting the first named means before the spring members have completely reacted or for permitting complete reaction.

51. In an adding machine, registering wheels, means including spring members for rotating said wheels, keys actuating said members to tension the same for the purpose stated, and means whereby the extent of reaction of the spring members is controlled by the registering wheels.

52. In an adding machine, registering wheels, means including spring members for rotating said wheels degrees corresponding to key values and for imparting carrying rotations to said wheels, and keys any one of which is capable of actuating any one of said members to tension the same to rotate the respective wheel to carry.

53. In an adding machine, denominational keys, registering wheels, and actuators including spring members tensioned upon the down-stroke of the keys and acting in their return to rotate said wheels degrees corresponding to key values and to rotate said wheels to carry.

54. In an adding machine, registering wheels in ordinal series, a denominational series of keys, a spring actuator tensioned by said keys for rotating the wheel of lower order degrees to accord with key values, and spring actuators tensioned by the keys independently of said wheels and capable of rotating the registering wheels of higher order to carry.

55. In an adding machine, registering wheels in ordinal series, a denominational series of keys, a spring actuator tensioned by the keys for rotating the wheel of lower order degrees to accord with key values, and spring actuators including a member common to all of and tensioned by the keys independently of the wheels and capable of rotating the higher order wheels to carry.

56. In an adding machine, registering wheels in ordinal series, a denominational series of keys, a spring actuator tensioned by the keys for rotating the wheel of lower order degrees to accord with key values, spring actuators tensioned by the keys independently of the wheels and capable of rotating the wheels of higher order to carry, and means whereby the carrying rotation is imparted to the higher order wheels at the proper time.

57. In an adding machine, registering wheels in ordinal series, a denominational series of keys, a spring actuator tensioned by the keys for rotating the wheel of lower order degrees to accord with key values, spring actuators tensioned by the keys independently of the wheels and capable of rotating the higher order wheels to carry, locking means for the higher order wheels, and means including elements carried by the wheels whereby the locking means is released and the respective actuators are caused to impart carrying rotations to the higher order wheels at the proper time.

58. In an adding machine, registering wheels in ordinal series, a denominational series of keys, a spring actuator tensioned by the keys for rotating the lower order wheel degrees to accord with key values, spring actuators tensioned by the keys independently of the wheels and capable of rotating the higher order wheels to carry, locking means for the higher order wheels including a detent for each wheel, a latch engaging each detent, and projections carried by the respective actuators and engaging the detents, and means including elements carried by the wheels whereby the arresting means is released and the respective actuators are caused to impart carrying rotations to the higher order wheels at the proper time.

59. In an adding machine, registering wheels, series of denominational keys, actuators operated by the keys for rotating said wheels degrees corresponding to key values, and means whereby the actuator relating to one series of keys is enabled by actuation of a key of another series to impart a carrying rotation to the wheel of the first named series.

60. In an adding machine, registering wheels, series of denominational keys, actuators operated by the keys for rotating said wheels degrees corresponding to key values, and means including a member common to all of the keys whereby the actuator relating to one series of keys is enabled by actuation of a key of another series to impart a carrying rotation to the wheel of the first named series.

61. In an adding machine, registering wheels, series of denominational keys, actuators operated by the keys for rotating said wheels degrees to accord with key values, and means including a member common to all of the keys and elements carried by said wheels whereby the actuator relating to one series of keys is enabled by actuation of a key of another series to impart a carrying rotation to the wheel of the first named series at the proper time.

62. In an adding machine, registering wheels, series of denominational keys, spring actuators tensioned by the keys for rotating said wheels degrees to accord with key values, and means whereby the actuator relating to one series of keys is enabled by actuation of a key of another series to impart a carrying rotation to the wheels of the first named series.

63. In an adding machine, registering wheels, series of denominational keys, spring actuators tensioned by the keys for rotating said wheels degrees to accord with key values, and means including a member common to all of the keys whereby an actuator relating to one series of keys is enabled by actuation of a key of another series to impart a carrying rotation to the wheel of the first named series, 64. In an adding machine, registering wheels, series of denominational keys, spring actuators tensioned by the keys for rotating said wheels degrees to accord with key values, and means including a member common to all of the keys and elements carried by said wheels whereby the actuator relating to one series of keys is enabled by actuation of a key of another series to impart a carrying rotation to the wheel of the first named series at the proper time.

65. In an adding machine, registering wheels, keys operable each to register its denominational value upon its respective wheel, and spring actuators normally under tension and operative to rotate the wheels to carry, said actuators being tensioned by the keys independently of the key-value operation.

66. In an adding machine, register wheels, denominational keys, spring actuators operable by said keys to impart to their respective wheels movement to register key values and movement to register a carry, and means capable of operation during the key-value movement of one actuator to tension the spring of another actuator for carry operation.

67. In an adding machine, register wheels, denominational keys, and spring actuators operable to impart to their respective wheels movement to register key values and movement to register a carry, each actuator capable of operation to tension its own spring or key-value operation and to simultaneously tension the spring of another actuator for carry operation.

68. In an adding machine, register wheels, denominational keys, actuators operable to impart to their respective wheels movement to register key values and movement to register a carry, and means capable of operation during the key value movement of one actuator to restore another actuator from position after carry to normal position.

69. In an adding machine, register wheels, denominational keys, and actuators operable to impart to their respective wheels movement to register key values and movement to register a carry, each actuator capable of operation during its key value movement to restore another actuator from position after carry to normal position.

70. In an adding machine, register wheels, denominational keys, actuators operable to impart to their respective wheels movement to register key values and movement to register a carry, and means operable during the key-value actuation to restore any actuator in position after carry to normal position.

In testimony whereof I affix my signature in presence of two witnesses.

GEORGE C. CHASE.

Witnesses:
L. D. TAGGART,
I. F. HARNELL.